(12) United States Patent  
Schlatter

(10) Patent No.: US 7,536,894 B2  
(45) Date of Patent: May 26, 2009

(54) METHOD AND DEVICE FOR THE PRODUCTION OF THE THIN-WALLED PART

(75) Inventor: Ulrich Schlatter, Lyss (CH)

(73) Assignee: Feintool International Holding AG (CH)

( * ) Notice: Subject to any disclaimer, the term of this patent is extended or adjusted under 35 U.S.C. 154(b) by 0 days.

(21) Appl. No.: 10/582,731

(22) PCT Filed: Dec. 6, 2004

(86) PCT No.: PCT/EP2004/013826

§ 371 (c)(1),
(2), (4) Date: May 29, 2007

(87) PCT Pub. No.: WO2005/056231

PCT Pub. Date: Jun. 23, 2005

(65) Prior Publication Data

US 2007/0251290 A1   Nov. 1, 2007

(30) Foreign Application Priority Data

Dec. 11, 2003   (DE)   ................ 103 58 287

(51) Int. Cl.
B21D 22/20   (2006.01)
B21D 28/32   (2006.01)

(52) U.S. Cl. .............................. 72/350; 72/341; 72/336

(58) Field of Classification Search ........... 72/348–350, 72/370.27, 341
See application file for complete search history.

(56) References Cited

U.S. PATENT DOCUMENTS 5,678,444 A * 10/1997 Nagamori ..................... 72/333

FOREIGN PATENT DOCUMENTS

| CH | 636542 A5 | 6/1983 |
| DE | 4437399 A1 | 4/1996 |
| EP | 0722792 A | 7/1996 |
| WO | WO 00/43145 A | 7/2000 |

* cited by examiner

Primary Examiner—Dana Ross
Assistant Examiner—Debra M Sullivan
(74) Attorney, Agent, or Firm—Bachman & LaPointe, P.C.

(57) ABSTRACT

Disclosed is a method for producing a thin-walled part (33), especially a pipe section. According to said method, the wall (11) of the part (33) is drawn out from a strip (1) of material, an inner contour (17) is cut out, the wall is stretched to size, and an outer contour is cut out of the strip (1) of material.

14 Claims, 4 Drawing Sheets

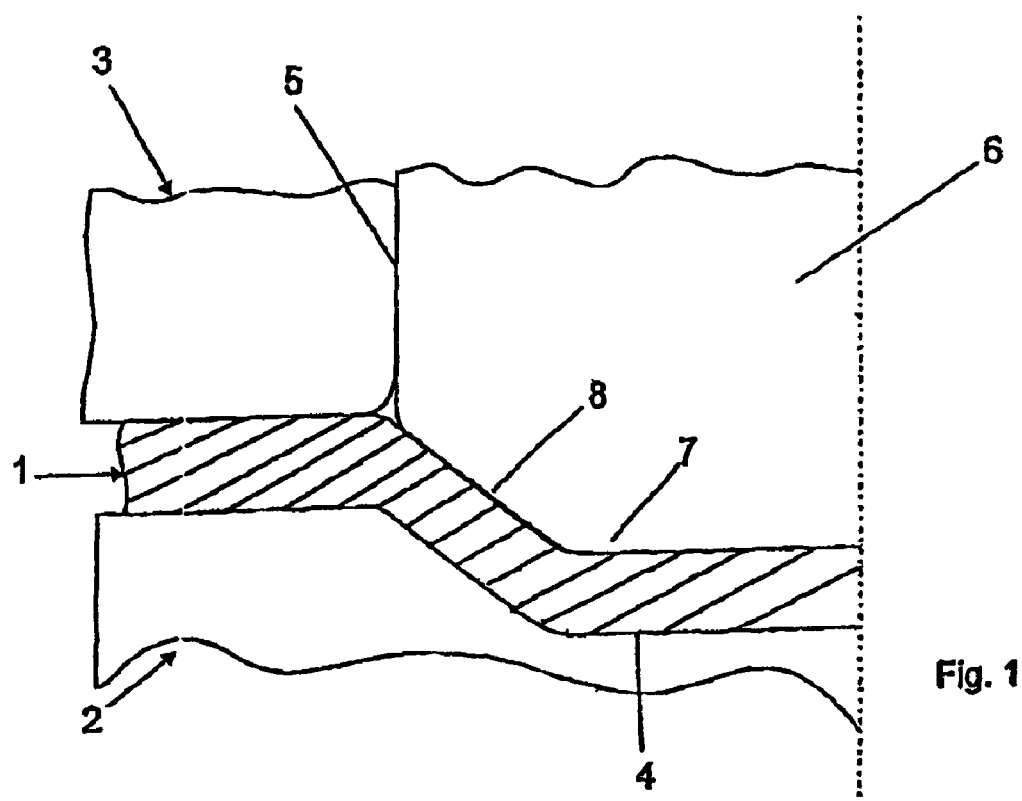
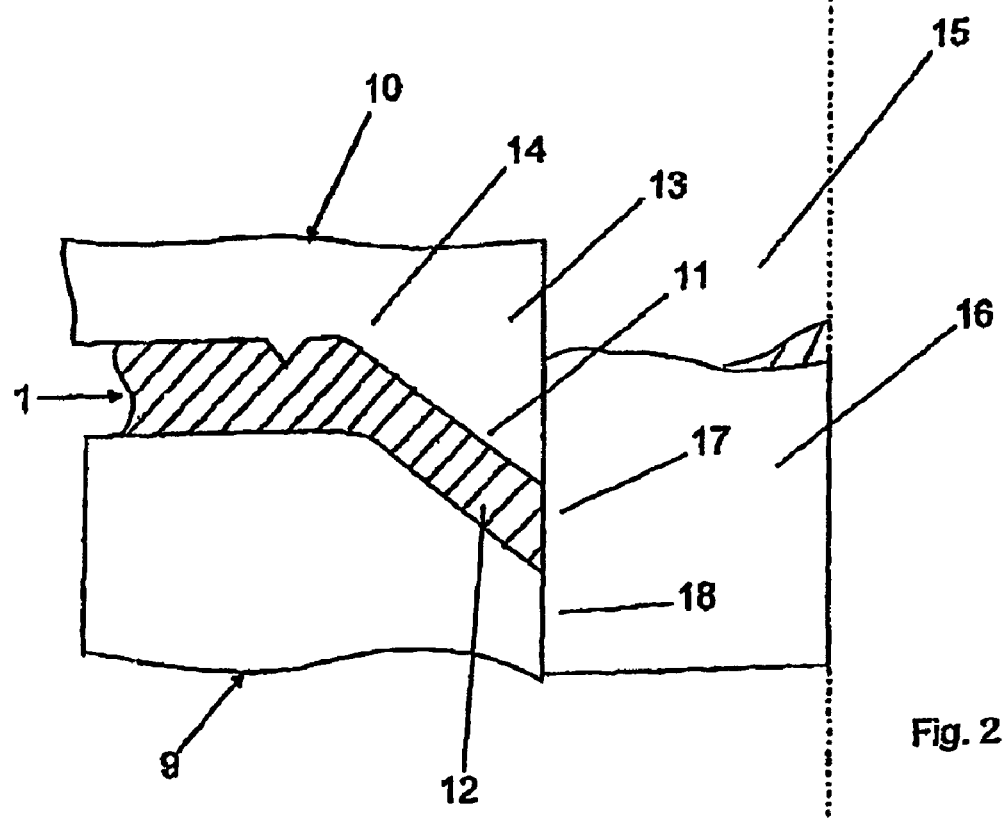
Fig. 1
Fig. 2

METHOD AND DEVICE FOR THE PRODUCTION OF THE THIN-WALLED PART

The invention relates to a method for the production of a thin-walled part, especially a pipe section, and a device for that purpose.

PRIOR ART

Parts are required and produced in many and diverse forms and executions at the present time. For example, parts are formed from a metal strip by punching or precision blanking. Previously disclosed by DE 199 53 059 A1, for example, is a receiving bearing for receiving and/or moving at least one reading head arrangement, in which two plate elements are set at a distance and positioned exactly. This is effected by means of spacer elements, which are formed from the plate element by precision blanking and/or cold-forming.

Previously disclosed by CH 636 542 is a method for the production of flared bushes and flared bushes, in which the deep-drawing process is used. For this purpose, the starting material is supplied to a series of deep-drawing stations, so that a kind of cup is produced. The base of the cup is then perforated, in conjunction with which the liberated material is forced to the side. Further deep-drawing processes are then performed until production of the flared bush is complete.

The present invention is concerned with the production of cylindrical structural members or, for example, pipe sections. It is concerned in particular with the production of cam rings for assembled camshafts intended for installation in internal combustion engines. The individual cams are manufactured today as a forging blank with subsequent machining and cutting from a precision pipe and with subsequent forming without cutting.

OBJECT OF THE INVENTION

The object of the present invention is to make available a method and a device of the above-mentioned kind, with which thin-walled parts can be produced with high precision. In addition, unlike conventional precision blanking, the weight of the material and the proportion of the material cost should be significantly reduced.

Achievement of the Object

The characterizing features of patent claim 1 lead to the achievement of this object.

This means that a pipe section, for example, can be manufactured by the precision blanking metal forming process. The special feature of the production process is that punching or precision blanking is conventionally performed on the thick-walled plate, and forming is performed on the thin-walled component by cold-forming. Material wastage can be reduced to a minimum in this way. In addition, thin-walled pipe sections are produced to the required precision, for example with a tolerance of 1/10 in the thickness deviation and a dimensional accuracy of ±0.06. No pipes of this kind, from which such pipe sections can be cut, are currently available on the market.

Production of the part preferably takes place in at least five stages. A clamping plate, a guide plate and a drawing die are used in a first stage. A cavity is formed in the face of the clamping plate, in conjunction with which importance must be attached here above all to the inclination of the cavity to a cavity floor. A suitable strip of sheet metal is clamped between the clamping plate and the guide plate. The drawing die is moved in an opening in the guide plate as far as the strip of sheet metal, in conjunction with which the drawing die presses an area of the strip of sheet metal down into the cavity. The preferred thinning of the areas that are drawn into the cavity already takes place in this "deep-drawing process".

In a second tool, and in a second operating stage, the strip of material is now clamped with the deep-drawn area between a clamping plate and a further guide plate, in conjunction with which these two plates are formed in such a way that one supporting surface of the clamping plate engages beneath the inclined area of the deep-drawn area, whereas the guide plate engages with a pressure wall above the inclined area. Provided in addition on the guide-plate is a knife-edged ring, which prevents the further flow of material from the strip of material. A guide opening in the guide plate and an opening in the clamping plate each exhibit an inner contour, which lies in approximately the same plane. A cutting die is introduced into both openings so that an internal contour is cut from the deep-drawn area of the strip of material.

In a further process stage, a peripheral area of the part, which consists essentially of the obliquely inclined area, is bent in one or more stages. If a pipe section is to be produced, the bending or the ironing takes place at about 90° in relation to the strip of material, which for the time being continues to be held between the clamping plate and the guide plate.

To ensure that space remains available for the wall area of the part, an appropriate clamping plate exhibits a corner bead, which possesses a depth corresponding more or less to the wall thickness of the part. In addition, a further reduction in the wall thickness of the part is achieved in conjunction with the ironing of the part.

Cutting of the part from the strip of material takes place in the next operating stage, in conjunction with which a part of the outer contour of the part is ultimately produced. In one illustrative embodiment, a tool is provided for this purpose, in which a fixed die makes an indentation in accordance with a shoulder form. The edge of the shoulder forms a cutting edge. The depth of the indentation in turn corresponds to the wall thickness of the part.

Cutting is effected by a lifting movement of a guide plate and a clamping plate in relation to the cutting edge of the die. In conjunction with this, the guide plate envelops the die and holds the strip of sheet metal with the part, which engages above the clamping plate, still arranged thereon.

Following parting, for example calibration of the part in the indentation of the die can take place of its own accord, for example, by subjecting the part to a corresponding ejection die. The latter can then also be used for ejecting the part.

Through the method according to the invention, or in the device according to the invention, cam rings can be produced in this way, for example, which are pushed onto a bar-shaped or pipe-shaped shaft and are secured thereto. In order to prevent radial movement of the pipe section in relation to the shaft, the pipe section can exhibit an egg-shaped cross section.

Thus, according to the present invention, a highly precise ring-shaped body can be produced from a thin metal sheet by a process of radial stretching, with simultaneous forming by ironing. The inner and outer form of the ring can have optional geometries; for example, the ring can be oval, toothed, round, etc.

DESCRIPTION OF THE DRAWINGS

Further advantages, characteristics and details of the invention can be appreciated from the following description of preferred illustrative embodiments and with reference to the drawing; in the drawing, FIG. 1 shows a schematically represented section through a tool for drawing the contour of a part from a strip of material;

FIG. 2 shows a partially represented section through a tool for cutting an inner contour of the part;

DETAILED DESCRIPTION

Figure 3:
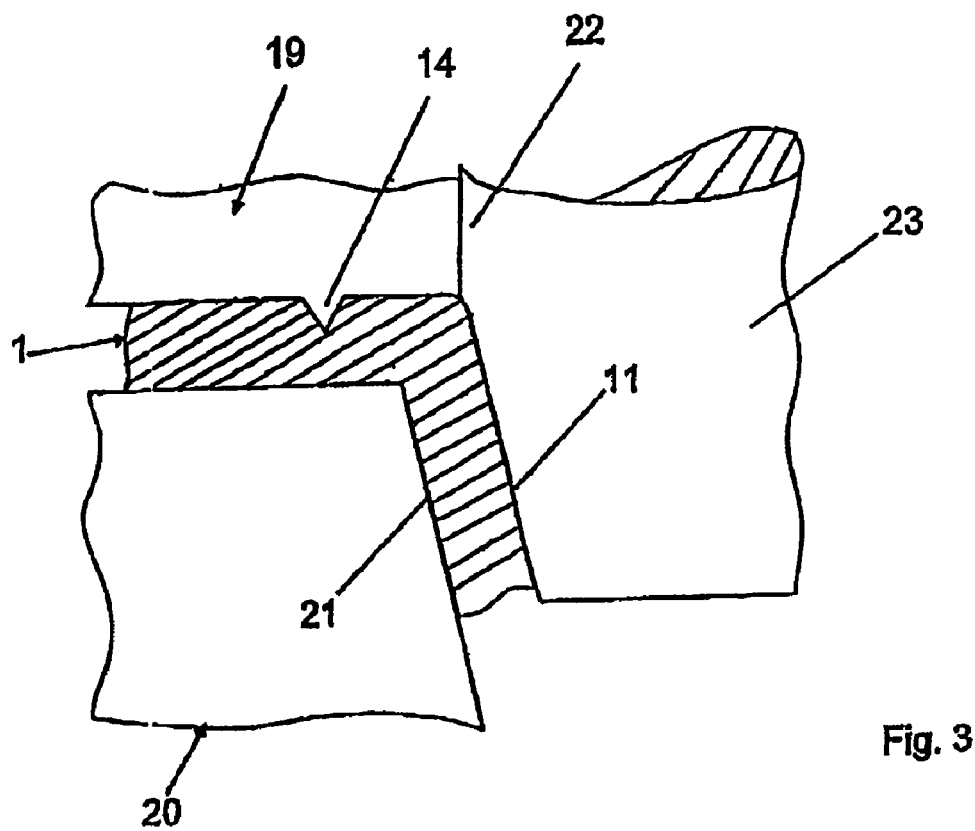
FIG. 3 shows a partially represented section through a tool for bending a wall area of the part.

A strip 1 of material, preferably a strip of sheet metal, is held between a clamping plate 2 and a guide plate 3, as shown in FIG. 1. A cavity 4 is formed on a face of the clamping plate 2, while the guide plate 3 exhibits an opening 5 for guiding a drawing die 6. This drawing die 6 preferably exhibits a face 7, which more or less corresponds to the contour of the cavity 4.

If the drawing die 6 is caused to move against the clamping plate 2, the drawing die 6 presses a contour 8 of a subsequent part from the strip 3 of material.

In a further process stage according to FIG. 2, the strip 1 of material together with the contour 8 are held by a further clamping plate 9 and a guide plate 10. The clamping plate 9 in this case engages below a wall area 11 of the part with a supporting surface 12, which corresponds to an incline of the contour 4 according to FIG. 1.

A pressure wall 13 on the guide plate 10 interacts with the supporting surface 12, so that the wall area 11 is received between the pressure wall 13 and the supporting surface 12. In addition, the guide plate 10 engages with a knife-edged ring 14 in the material strips 11. A cutting die 16 is guided in an opening 15 in the guide plate 10, by-means of which die an inner contour 17 of the wall area 11 can be cut. For this purpose, the cutting die 16 moves in the opening 15 in the guide plate 10, and after cutting engages in an opening 18 in the clamping plate 9.

Bending of the wall area 11 takes place in a further process stage according to FIG. 3, in conjunction with which the strip 1 of material together with the wall area 11 is held between a guide plate 19 with the knife-edged ring 14 and a clamping plate 20. A supporting surface 21 of the clamping plate 20 in this case exhibits a greater inclination than the supporting surface 12 of the clamping plate 9 according to FIG. 2.

The pressure wall according to FIG. 2 is missing from the guide plate 19, although a bending die 23 is guided in an opening 22 in the guide plate 19.

Figure 4:
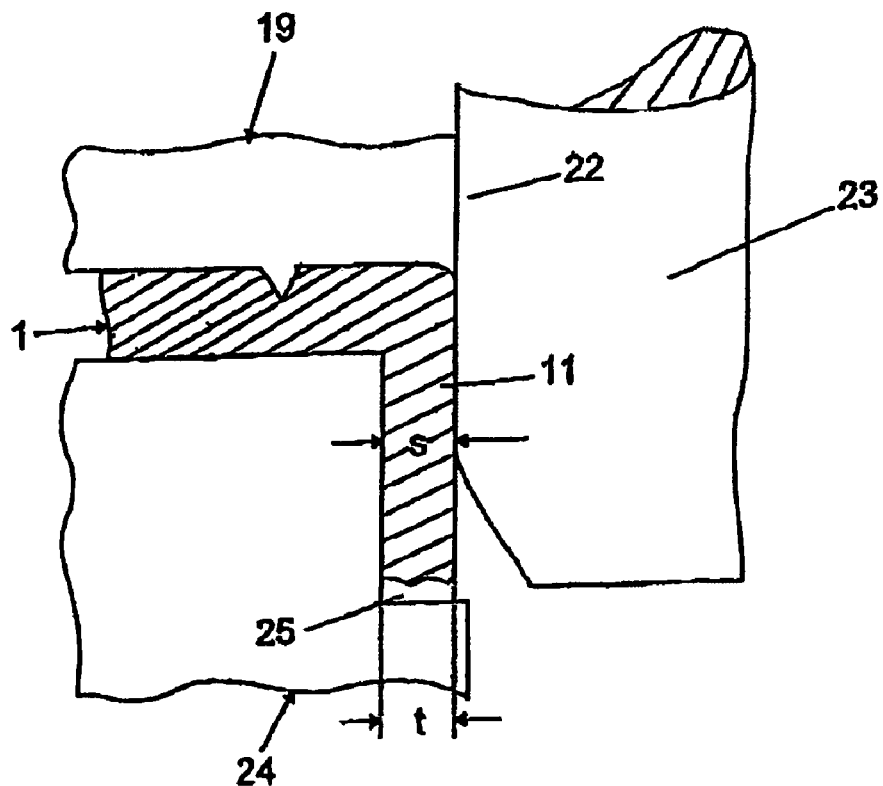
FIGS. 4 and 5 show partial sections through a tool for ironing the part.

According to FIG. 4, the strip 1 of material is held between the guide plate 19 and a clamping plate 24, which possesses a corner bead 25, which exhibits a depth t that corresponds more or less to the thickness s of the wall area 11. The guide plate 19 also projects above the clamping plate 24 to more or less the same extent.

Figure 5:
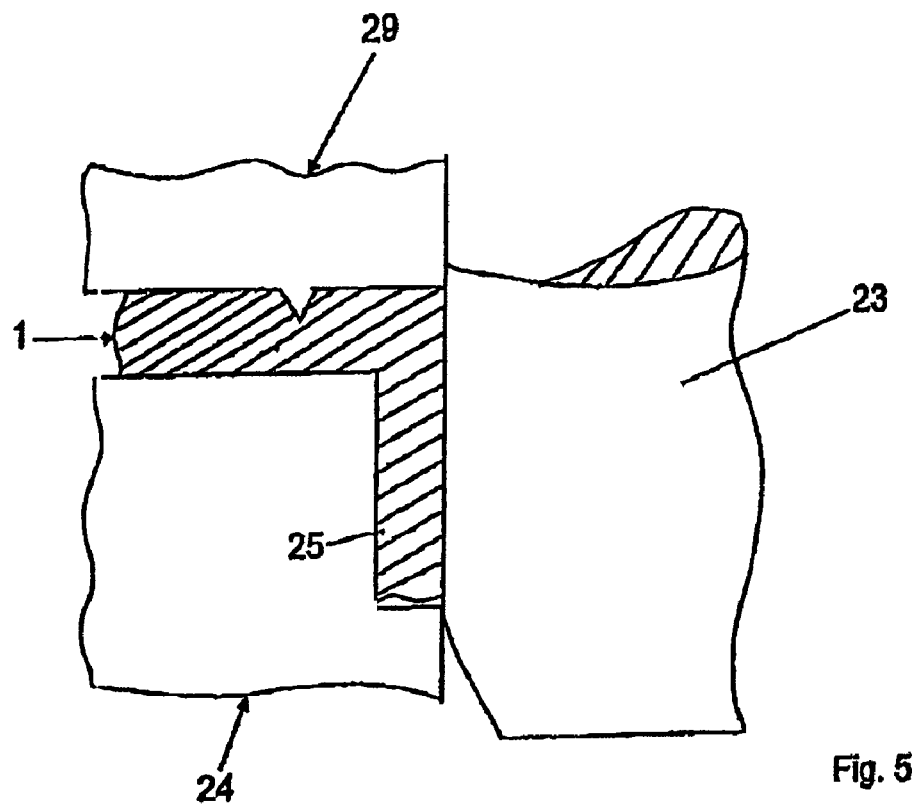

Guided in the opening 22 in the guide plate 19 is a drawing die 26, which causes the wall area 11 to be bent through about 90° in relation to the strip 1 of material and, as can be appreciated in FIG. 5, to be ironed into the corner bead 25. This takes place preferably by cold-forming, i.e. material from the wall area 11 is used to fill the corner bead 25, so that the thickness s of the wall area 11 is reduced.

Figure 6:
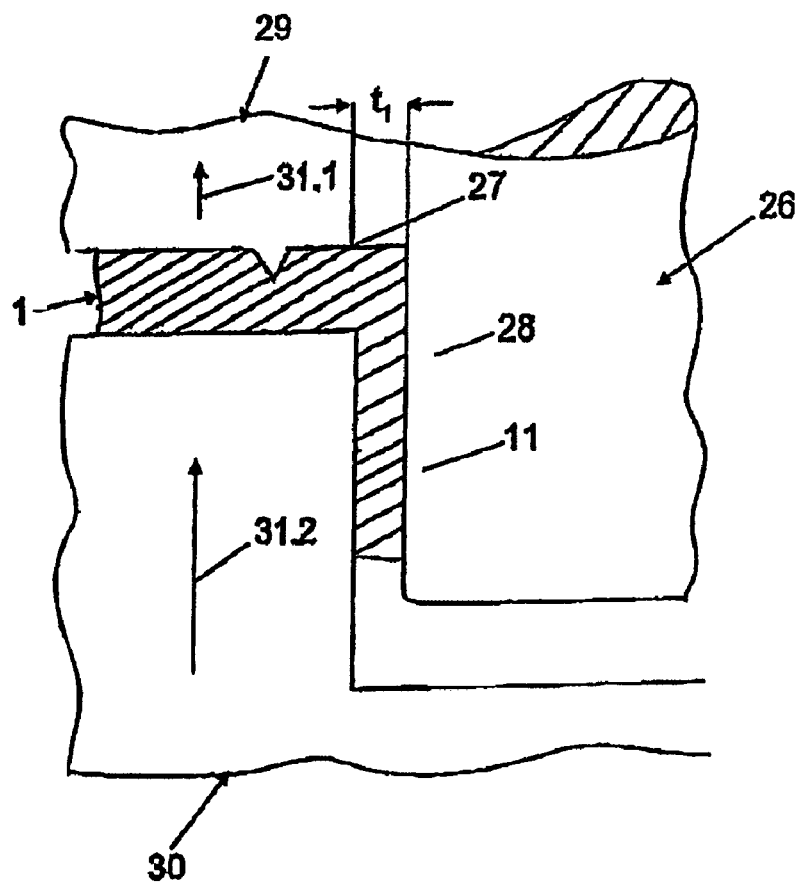
FIG. 6 shows a partially represented section through a tool for cutting an outer contour of the part.

According to FIG. 6, the wall area 11 is now separated from the strip 1 of material. A static cutting die 26 is used for this purpose, which exhibits a cutting edge 27. An indentation 28 is formed on the cutting die 26 after the cutting edge 27, in conjunction with which a depth $t_1$ of the indentation 28 corresponds more or less to a wall thickness s of the finished part.

The strip 1 of material is held by a guide plate 29 and a clamping plate 30, which together are capable of movement relative to the cutting die 26, as indicated by the arrows 31.1 and 31.2. This movement causes the wall area 11 of the strip 1 of material to be parted in interaction with the cutting edge 27.

Figure 7:
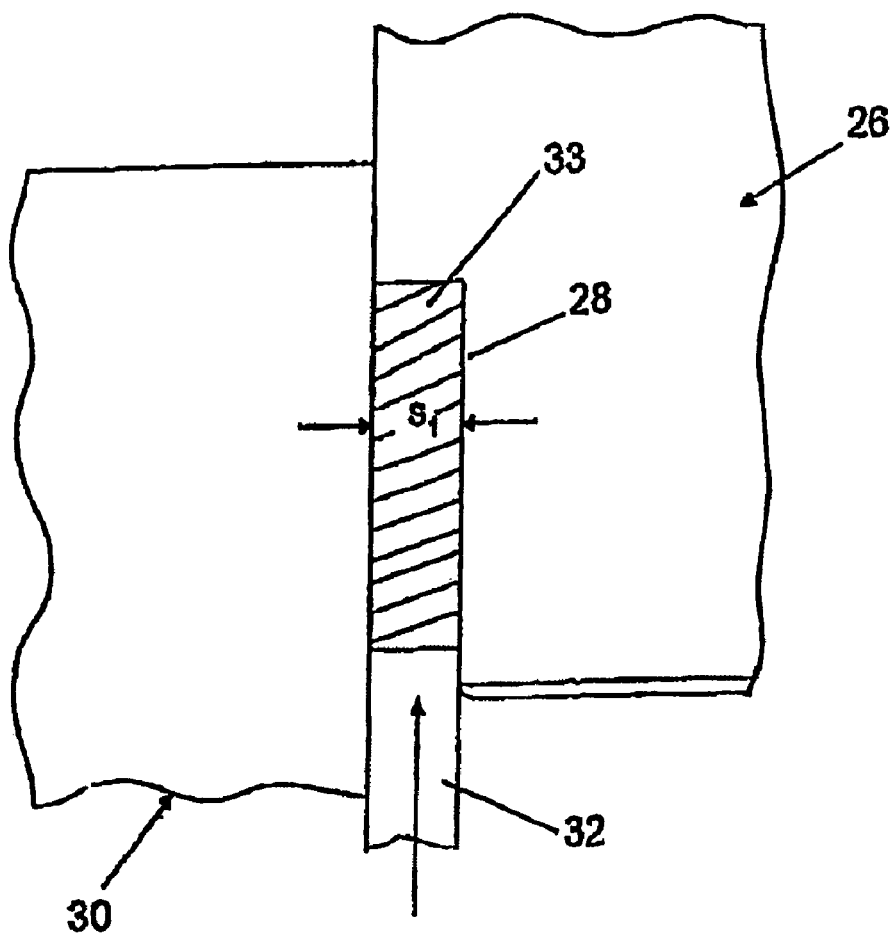
FIG. 7 shows a partially represented section through a tool for calibrating and ejecting the part.
Figure 8:
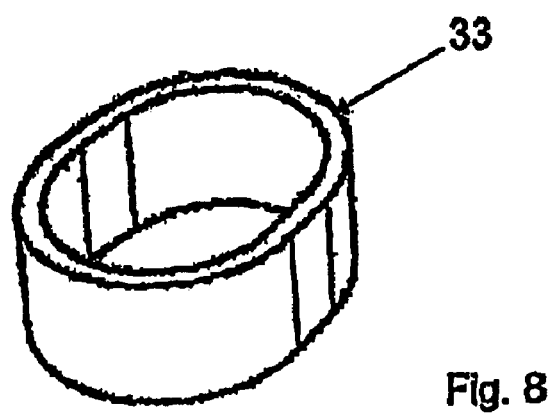
FIG. 8 shows a perspective view of a part in accordance with the invention.

As shown in FIG. 7, calibration of the part 33 now takes place in conjunction with the cutting die 26 and an ejector 32, to which parts its ultimate form is now imparted.

After removal of the cutting die 26, the part 33 can be ejected from the clamping plate 30.

| List of Reference Designations | |
|---|---|
| 1 | Strip of material |
| 2 | Clamping plate |
| 3 | Guide plate |
| 4 | Cavity |
| 5 | Opening |
| 6 | Drawing die |
| 7 | Face |
| 8 | Contour |
| 9 | Clamping plate |
| 10 | Guide plate |
| 11 | Wall area |
| 12 | Supporting surface |
| 13 | Pressure wall |
| 14 | Knife-edged ring |
| 15 | Opening |
| 16 | Cutting die |
| 17 | Inner contour |
| 18 | Opening |
| 19 | Guide plate |
| 20 | Clamping plate |
| 21 | Supporting surface |
| 22 | Opening |
| 23 | Bending die |
| 24 | Clamping plate |
| 25 | Corner bead |
| 26 | Cutting die |
| 27 | Cutting edge |
| 28 | Indentation |
| 29 | Guide plate |
| 30 | Clamping plate |
| 31 | Arrow |
| 32 | Ejector |
| 33 | Part |
| 34 | |
| 35 | |
| 36 | |
| 37 | |
| 38 | |
| 39 | |
| 40 | |
| 41 | |
| 42 | |
| 43 | |
| 44 | |
| 45 | |
| 46 | |
| 47 | |
| 48 | |
| 49 | |
| 50 | |
| 51 | |
| 52 | |
| 53 | |
| 54 | |
| 55 | |

-continued

List of Reference Designations

| | |
|---|---|
| 56 | |
| 57 | |
| 58 | |
| 59 | |
| 60 | |
| 61 | |
| 62 | |
| 63 | |
| 64 | |
| 65 | |
| 66 | |
| 67 | |
| 68 | |
| 69 | |
| 70 | |
| 71 | |
| 72 | |
| 73 | |
| 74 | |
| 75 | |
| 76 | |
| 77 | |
| 78 | |
| 79 | |
| $s_1$ | Wall thickness |
| s | Thickness of 11 |
| t | Depth of 25 |
| $t_1$ | Depth of 28 |

The invention claimed is:

1. A method for the production of a thin-walled part (33), in which a strip (1) of material is clamped between a clamping plate with a cavity (4) and a guide plate (3) to guide a drawing die (6), and a contour for the part (33) is drawn by the drawing die (6) in the cavity (4) in the clamping plate (2), after which cutting of an inner contour (17) followed by ironing of a wall area (11) of the part (33) between the inner contour (17) and the rest of the strip (1) of material takes place, and then an outer contour of the part (33) is cut from the strip (1) of material and the part (33) is ejected, wherein, between cutting of the inner contour (17) and ironing, at least one further bending of the wall (11) of the part (33) takes place.

2. The method as claimed in claim 1, characterized in that the wall (11) of the part (33) is bent at an angle from the strip (1) of material by the drawing die (6).

3. The method as claimed in claim 1, characterized in that the thickness (s) of the wall (11) of the part (33) in relation to the thickness of the strip (1) of material is reduced by the drawing die (6).

4. The method as claimed in claim 1, characterized in that, in conjunction with ironing of the part (33), its wall (11) is formed by about 90° in relation to the strip (1) of material.

5. The method as claimed in claim 1, characterized in that, in conjunction with ironing of the part (33), its wall thickness (s) is reduced in relation to the thickness of the strip (1) of material.

6. The method as claimed in claim 1, characterized in that the part (33) is calibrated after parting from the strip (1) of material.

7. The method as claimed in claim 1, characterized in that the part is a pipe section (33), which is placed on a bar-shaped or pipe-shaped shaft of a camshaft with cams arranged thereon and is secured thereto.

8. The method as claimed in claim 7, characterized in that the pipe sections (33) are secured to the shaft by welding.

9. The method as claimed in claim 7, characterized in that the pipe sections (33) are executed with an egg-shaped cross-section.

10. A device for production of a thin-walled part (33), comprising a clamping plate with a cavity, and a guide plate for guiding a drawing die, wherein a strip (1) of material can be clamped between the clamping plate with the cavity (4) and the guide plate (3), and a contour for the part (33) can be drawn by the drawing die (6) in the cavity (4) in the clamping plate (2), characterized in that, for the purpose of cutting an inner contour (17), a cutting die (16) is guided in a further guide plate (10), which with an inclined pressure wall (13) makes contact with the wall area (11) of the part (33), so that the latter is held between the pressure wall (13) and a supporting surface (12) of a clamping plate (9), in conjunction with which the supporting surface (12) at least partially envelops an opening (18) into which the cutting punch is introduced, and further comprising a bending die (23) for bending the strip (1) of material after cutting of the inner contour (17).

11. A device as claimed in claim 10, characterized in that, for the purpose of ironing the wall area (11) of the part (33), the bending die (23) is guided in a guide plate (19) and a clamping plate (24) exhibits a corner bead (25) to receive the wall area (11).

12. A device as claimed in claim 10, characterized in that, for the purpose of cutting the outer contour, a cutting die (26) with a cutting edge (27) is guided relative to a guide plate (29), in conjunction with which the cutting die (26) exhibits an indentation (28) on its cutting edge (27), between which or an opening wall of the clamping plate (30) the wall (11) of the part (33) is present.

13. A device as claimed in claim 10, characterized in that the guide plate (10, 19, 29) is provided with a knife-edged ring (14).

14. A device as claimed in claim 10, characterized in that the part is a pipe section (33), which can be placed on a bar-shaped or pipe-shaped shaft of a camshaft with cams arranged thereon and can be secured thereto.

* * * * *